Figure 1:
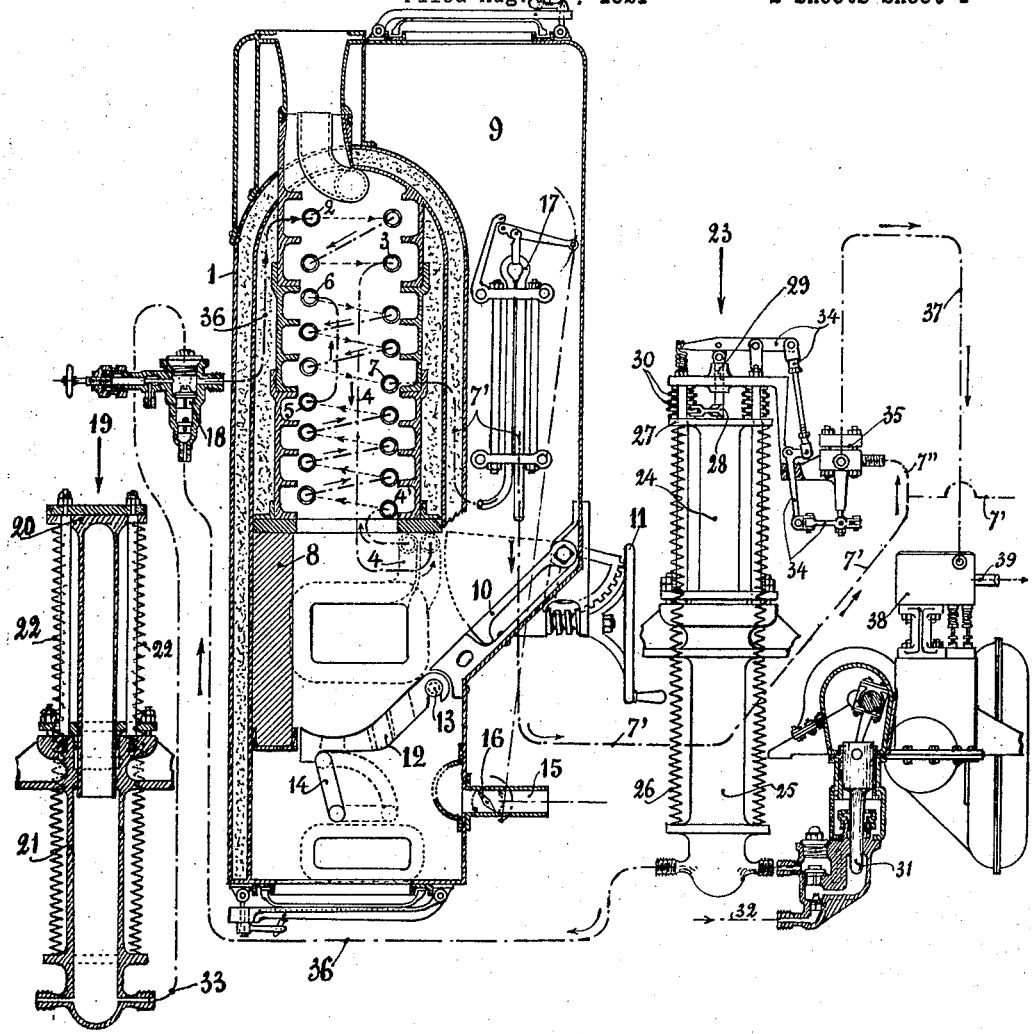

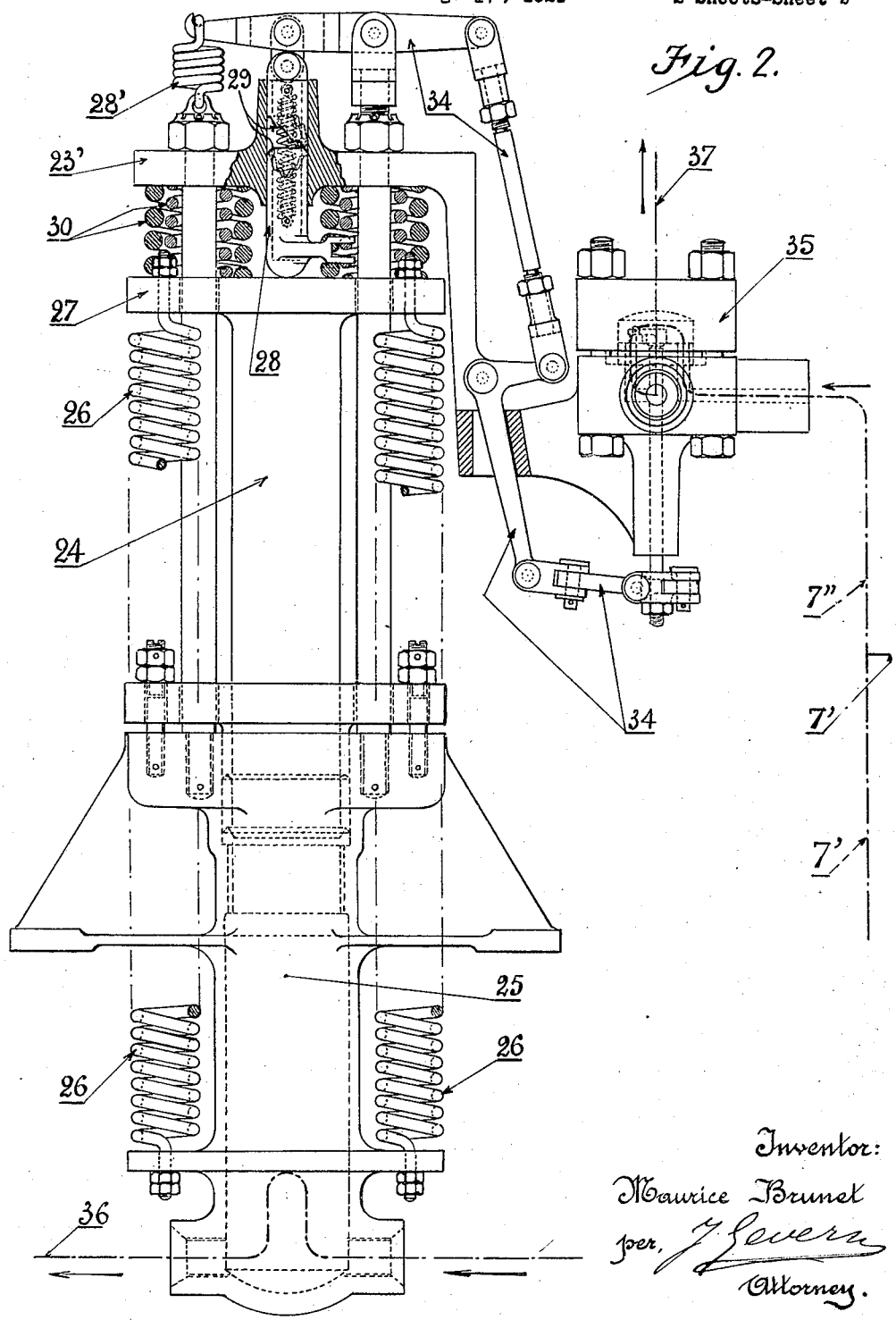

Patented Jan. 8, 1924.

1,479,890

UNITED STATES PATENT OFFICE.

MAURICE BRUNET, OF LIEGE, BELGIUM, ASSIGNOR TO MAISON DETILLEUX, SOCIÉTÉ ANONYME, OF LIEGE, BELGIUM.

APPARATUS FOR REGULATING THE SUPPLY OF WATER TO INSTANTANEOUS STEAM GENERATORS.

Application filed August 17, 1921. Serial No. 493,104.

(GRANTED UNDER THE PROVISIONS OF THE ACT OF MARCH 3, 1921, 41 STAT. L., 1313.)

*To all whom it may concern:*

Be it known that I, MAURICE BRUNET, a subject of the King of the Belgians, residing at Liege, Belgium, 84 Rue Sur-La-Fontaine, have invented certain Improvements Relating to Apparatus for Regulating the Supply of Water to Instantaneous Steam Generators, for which I have filed an application in France, bearing date of February 6, 1920, Patent No. 509,519, and of which the following is a specification.

The present invention relates to improvements relating to apparatus for regulating the supply of water to instantaneous steam generators, and more particularly in apparatus of the type wherein the output of the feed pump is controlled through the action on the admission of driving fluid to such pump of a device influenced by the pressure in the generator. The main object of the invention is to provide a device of this kind which will be of simple, economical and rational construction and which will be entirely automatic, safe and reliable in operation as well as capable of being readily adjusted according to the pressure for which it is desired that the admission of driving fluid to the feed pump should start being reduced and the maximum pressure for which it is desired that said admission should be entirely cut off, thus preventing said maximum pressure being exceeded.

The invention essentially consists of a novel combination of parts constituting the device referred to, and in the improved construction and arrangement of said parts. According to the invention the said device principally comprises a hydraulic accumulator comprising a cylinder placed on the feed pipe leading to the generator and a plunger working in said cylinder under the influence of the pressure in the generator and against the action of suitable return springs tending to retain said plunger within its cylinder, and means enabling this plunger during a predetermined portion of its movement to operate the valve controlling the admission of driving fluid to the feed pump, said means chiefly consisting of a suitable system of levers in operative relation with said valve and a longitudinally movable adjustable spring-pressed finger cooperating with the said system of levers and arranged at the plunger-end of the accumulator in the path of the plunger's movement.

The accompanying drawing shows, by way of example only, a steam generating plant embodying the feed water supply regulating apparatus according to the present invention, but it must be expressly understood that, while the invention has, to make the description easier, and in order that the kind of generating plant for which the apparatus forming the subject matter thereof is designed and its usefulness and action as an appliance of such plant may be more readily understood, been represented on the drawing as applied in connection with an instantaneous steam generator comprising three series of elements for the circulation of the fluid (a series of pre-heating elements, a series of vaporizing elements, and a series of superheating elements), and while such a boiler is, in order to provide a complete illustration described in detail hereunder, the invention may be applied in connection with all the other types of instantaneous steam generators.

In the drawing, Fig. 1 is a general view of the complete steam generating plant and Fig. 2 is an enlarged detail view showing the means enabling the plunger of the accumulator to influence the valve controlling the admission of driving fluid to the feed pump.

For the sake of clearness in the said drawing, certain parts have been shown in elevation, whereas other parts have been shown in section.

As may be seen from the drawing, the water supplied by the feed-pump is brought to the upper part of the generator or boiler by means of a feed-pipe 36, on which a check-valve 18 is placed. The feed-water enters at 2 at one end of a series of preheating elements, placed in the upper portion of the boiler and which it leaves at 3 to go from there by means of a pipe 4, which is preferably bent round the door of the furnace of the boiler, to one end 4' of a series of vaporizing elements located in the lower portion of the boiler. The steam generated in the latter elements leaves at the end 5 and is led to one of the ends 6 of a series of superheating elements situated in the boiler in a position intermediate between that of the pre-heating elements and that of the vaporizing elements. The superheated steam leaves the superheating elements at the end 7 and is led to the various apparatus wherein it is to be used by means of a steam-pipe 7'.

The boiler itself is surrounded by a metallic casing 1, and its furnace is provided with walls in fireproof material (such as 8) and with a feeding door.

If coke is employed as fuel, the latter is stored in a hopper 9 closed by a flap 10 operated by means of a handwheel 11; this handwheel allows the flap 10 to be placed in any position required, according to the size of the fuel and the intensity of the draught.

A grate 12 is placed at the bottom of the furnace; it is adapted to move about a horizontal axis 13 to allow an easy cleaning and is maintained in working position by means of a rocking piece 14.

The apparatus according to the invention is more particularly intended for use in steam generating plants wherein the boiler is fitted with a draught regulator, so as to obtain a generating plant wherein the working conditions are regulated automatically both according to temperature and according to pressure. The accompanying drawing shows, for illustrative purposes only, a suitable regulator of this kind, which comprises a valve or damper 16 arranged in the flue 15 serving to bring the forced air supplied by a fan under the furnace, and a pyrometer 17, formed for instance by a bend of the steam-pipe 7', and connected to the aforesaid valve in any suitable manner so that the latter is controlled by the motions of the said pyrometer 17.

The water-feeding is obtained by means of the small feed-pump 31 actuated by steam from the boiler, the water being supplied to the pump from any suitable source by a pipe 32, while the pumped water is supplied to the boiler by means of a feed-pipe 36, on which a check-valve 18 is interposed in order to prevent any return during the periods of suction of the pump.

For the purpose of regulating the water supply in an entirely automatic and reliable manner at all times, the regulating apparatus according to the invention is designed for use preferably in conjunction with a device ensuring a safe and shockless feeding on starting the generator. Such a device is therefore included in the steam generating plant illustrated by Figure 1, but it should, however, be understood that the said device itself forms no part of the invention. This device ensuring a safe and shockless feeding on starting the generator consists of an hydraulic accumulator 19, the lower portion of which is connected by means of a pipe 33 to a point of the feed-pipe 36 situated above the check-valve 18.

This accumulator comprises a plunger 20 adapted to move vertically and against the action of return springs 22 within a cylinder 21.

The said device operates in the following manner:

When the generator or boiler is being started the quantity of water contained in the tubes of the elements of the boiler is vaporized and the pressure thus created acts so as to drive the liquid, through the medium of the pipes 36 and 33, into the base portion of the cylinder 21 and under the plunger 20, which consequently rises; then, as soon as the water begins to fail in the boiler, the pressure becomes lower and, being no more sufficient to overcome the action of the return springs 22, the plunger 20, under the influence of the latter, returns to its lower position in the cylinder 21 and drives the water contained in the accumulator into the boiler.

This apparatus therefore acts like a kind of governor to ensure the regularity of the feeding.

In the example illustrated the device which, in the apparatus according to the invention, acts, under the influence of the pressure in the generator, on the admission of driving fluid to the feed pump so as to control the output of said pump comprises a hydraulic accumulator 23, which is interposed on the feed-pipe 36 between the pump 31 and the check valve 18 and which is adapted to act on the usual valve 35 controlling the admission of the steam or other fluid actuating the said feed-pump 31. This accumulator comprises a guided plunger 24 adapted to move vertically within a cylinder 25 against the action of suitable springs 26, which tend to bring back the plunger 24 in its initial or lower position. The upper part of the plunger 24 is constituted by a disc 27 which comes to bear, when the plunger reaches the highest portion of its stroke, against a finger 28 operating, through a system of suitable levers 34, the valve 35 which controls the passage of the steam towards the admission of the motor 38 of the feed-pump 31. To this effect, the valve 35 being connected on the one hand to the steam-pipe 7' by means of a branch-pipe 7'' on the latter, and on the other hand to the admission of the motor 38 of the feed-pump by means of a pipe 37.

The finger 28 is kept in its normal position in the path of the movement of the plunger 24 by means of a coil spring 28' which tends to keep said finger pressed towards the plunger 24, having one end fastened to the upper portion 23' or plunger-end of the accumulator and acting at the other end on the free end of the member of the system of levers 34 which is in relation with said finger 28.

A pipe 39 serves for the evacuation of the exhaust steam from the motor of the feed-pump. The finger 28 is divided in two parts of which the adjacent ends bear against each other by means of stepped cams 29 so as to make possible, through the rotation of one of the said parts to adjust as desired the height of the finger 28 and consequently to alter the position of the disc 27 of the piston 24 for which the valve 35 will cut off the passage of steam towards the admission of the motor 38 of the pump 31. In this way, the feeding of the boiler may be controlled so that the latter can work at different pressures according to the power to be produced. Springs 30 are provided to soften the action of the disc 27 on the finger 28.

The operation of this device, which controls the water supply automatically according to the needs of the boiler, is as follows:

As soon as the pressure inside the boiler, making its influence felt through the medium of the feed-pipe 36, is sufficiently high to overcome the resistance opposed by the springs 26 (which in the opposite case will maintain the plunger 24 lowered, which results in the water being unable to enter into the accumulator 23), the water from the pump, meeting less resistance to enter into the accumulator than to go towards the boiler, enters into the base portion of the accumulator 23, and causes the plunger 24 to rise, so that the latter, reaching the highest portion of its stroke, operates, through the finger 28 and the levers 34, the valve 35 in such a way as to cut-off the admission of steam to the motor 38 of the feed pump 31 by cutting off the communication between the steam branch-pipe 7″ and the pipe 37 leading the steam towards the admission of the motor of the feed-pump. The pump 31 is therefore stopped and ceases to supply water to the boiler. When the pressure inside the boiler becomes lower, as soon as the springs 26 are able to overcome same, they compel the plunger 24 to go back to its lower position and to drive the water accumulated in the accumulator 23 into the boiler, while on the other hand the finger 28 is enabled to return to its original position under the action of the spring 28′ and, through the levers 34, operates the valve 35 so as to allow again the passage of the steam of the branch pipe 7″ through the pipe 37 towards the motor 38 of the feed-pump 31, which is therefore restarted, and continues to supply water to the boiler.

It will readily be understood that the particular construction and arrangement of the finger 28 makes it possible, by varying the height of such finger, to obtain an automatic adjustment of the water supply suited to any working-pressure in the generator which it may be desired to adopt. Indeed, if for instance the height (or length) of the finger 28 is increased, the latter will require a smaller rise of the plunger 24 to be brought into action and thus cause the water supply to be first reduced and finally cut off in the manner explained above. As the plunger 24 rises proportionally to the pressure in the boiler, a lower pressure will be sufficient to bring the said plunger to the point where it comes into contact with the finger 28 and thus begins to influence the valve 35 and starts reducing the water supply, and the maximum pressure which the subsequent cutting off of said water supply will prevent from being exceeded will be correspondingly lowered. The adjustment of the height of the finger 28 therefore makes it possible to maintain automatically any desired predetermined maximum pressure in the generator.

It must be understood that the invention is in no way limited to the details and the particular arrangement of parts described and illustrated by way of example, and particularly that the improved apparatus forming the subject matter of the present invention may be arranged in any suitable manner according to the needs of each steam producing plant.

I claim:

1. In apparatus for regulating the supply of water to an instantaneous steam generator, of the type wherein the output of the feed-pump is controlled through the action on the admission of driving fluid to said pump of a device influenced by the pressure in the generator, the combination in said device of: a hydraulic accumulator comprising a cylinder interposed on the feed-pipe and in communication with the generator therethrough, a guided plunger working in said cylinder and a spring resistance applied to said plunger and normally tending to retain same within its cylinder; a longitudinally movable spring-pressed adjustable finger arranged axially in relation to the plunger and having its lower end normally situated at a predetermined point in the path of said plunger's stroke; and a system of suitably-arranged levers and connections, having one end-member in permanent operative relation with the upper end of said adjustable finger and the other end-member operatively connected to the valve controlling the admission of driving-fluid to the feed-pump; all substantially as described.

2. In apparatus for regulating the supply of water to an instantaneous steam generator according to claim 1, the adjustable finger composed of two aligned sections; means for adjusting the length of said finger, consisting of stepped cams formed in the adjacent ends of said two sections; and suitable hand-operated means for effecting such adjustment of the length of aforesaid finger by relative rotation of one of said sections with respect to the other; substantially as described.

3. In apparatus for regulating the supply of water to an instantaneous steam generator, of the type wherein the output, of the feed-pump is controlled through the action on the admission of driving-fluid to said pump of a device influenced by the pressure in the generator, the combination in said device of: a hydraulic accumulator comprising a cylinder interposed on the feed-pipe and in communication with the generator therethrough, a guided plunger working in said cylinder and a spring resistance applied to said plunger and normally tending to retain same within its cylinder; a system of levers operatively connected to the usual valve controlling the admission of driving fluid to the feed pump; and a longitudinally adjustable movable finger arranged to be acted upon by the aforesaid plunger against the indirect action of a suitable coil-spring during the last portion of said plunger's outward movement and the first portion of its return movement and to cooperate with said system of levers to cause the valve controlling the admission of driving fluid to the feed-pump to be influenced by the plunger's movement during the aforesaid portion of such movement, whereby on the plunger rising the admission of driving fluid will not start being reduced until a given pressure in the boiler is reached and said plunger has in consequence already effected a predetermined portion of its movement; substantially as described.

In testimony thereof I signed hereunto my name in the presence of two subscribing witnesses.

MAURICE BRUNET.

Witnesses:
M. GOFFARD,
FR. VAUCHAY.